Jan. 17, 1933. A. ROSSI 1,894,890
COMBINED AUTOMATIC CLUTCH AND TRANSMISSION MECHANISM FOR AUTOMOBILES
Filed April 28, 1932 5 Sheets-Sheet 3

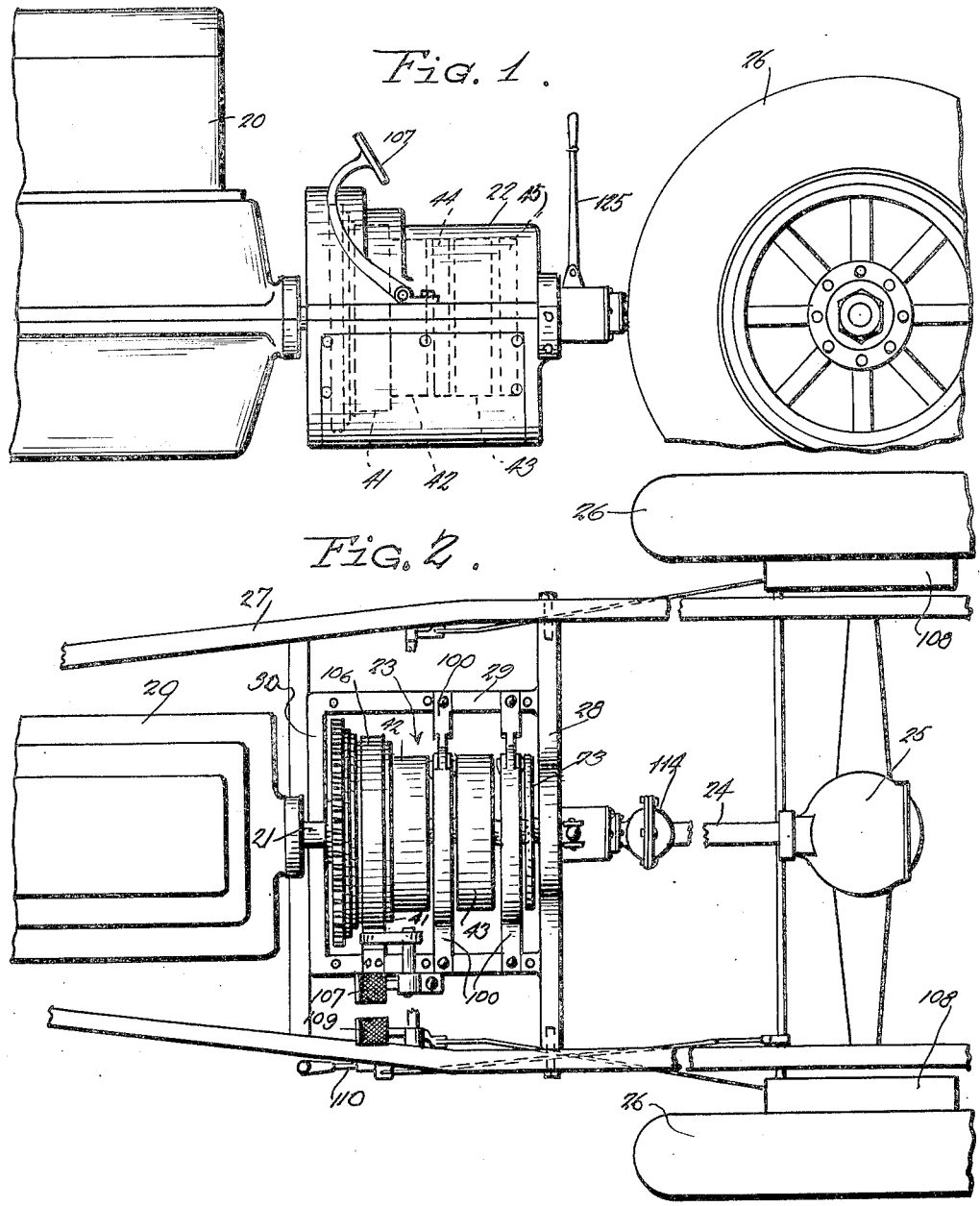

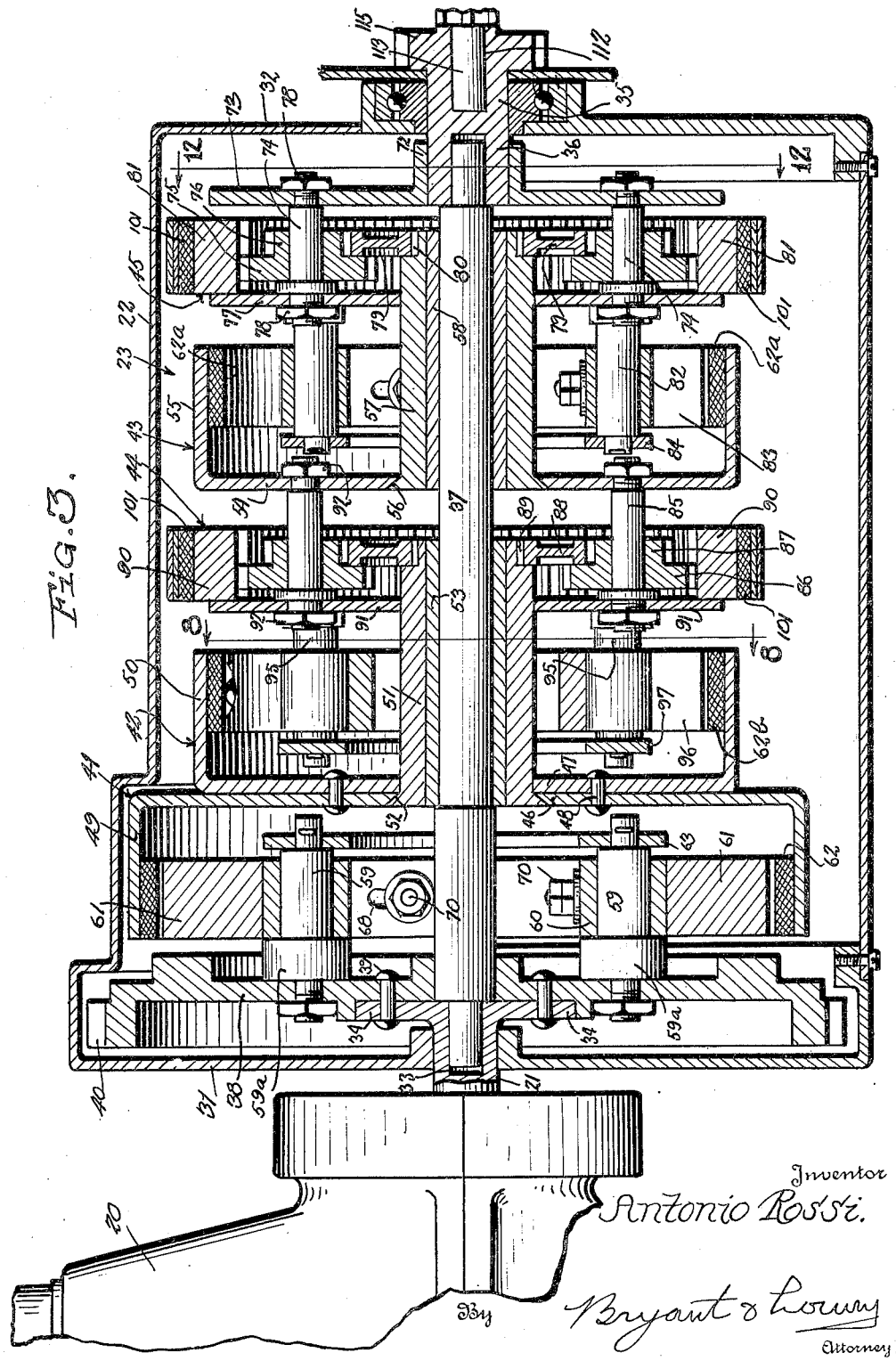

Inventor
Antonio Rossi.
By Bryant & Lowry
Attorneys

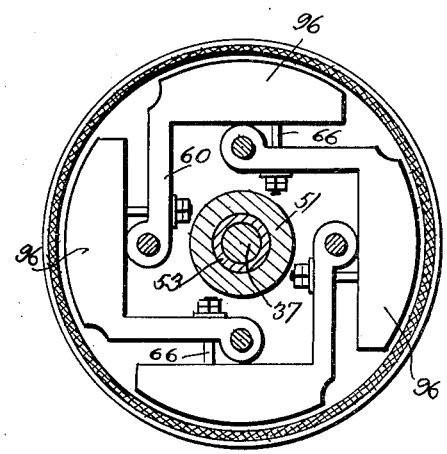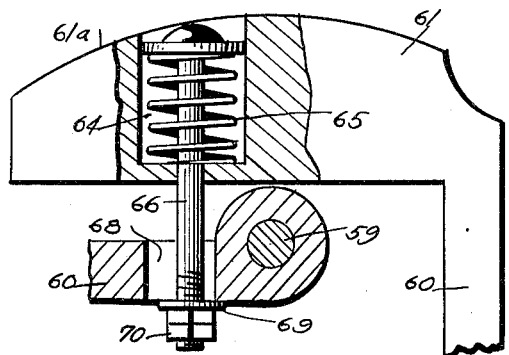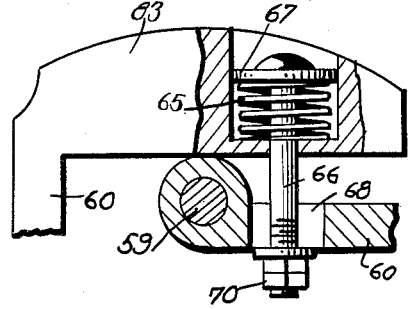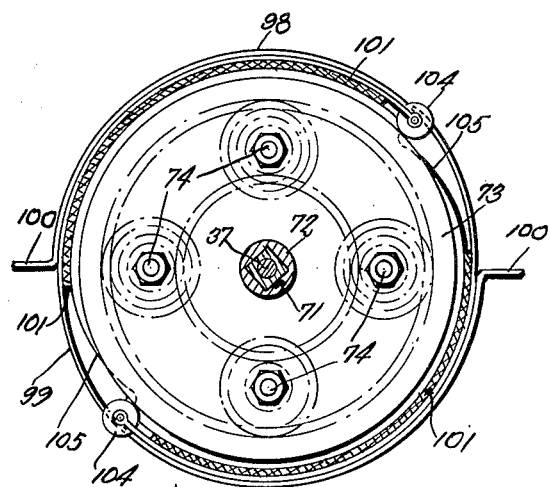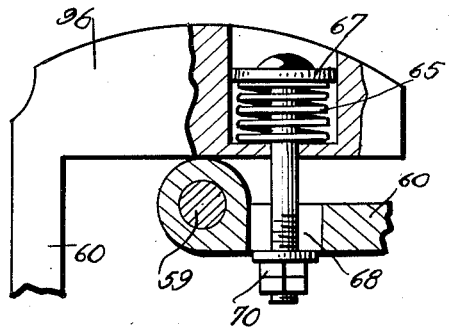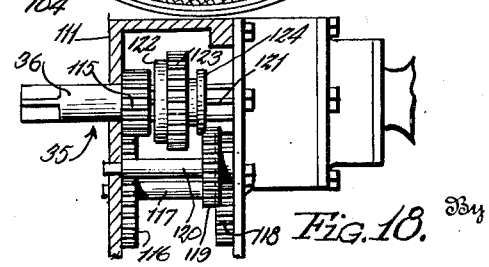

Jan. 17, 1933. A. ROSSI 1,894,890
COMBINED AUTOMATIC CLUTCH AND TRANSMISSION MECHANISM FOR AUTOMOBILES
Filed April 28, 1932 5 Sheets-Sheet 5

Inventor
Antonio Rossi.
By Bryant & Lowry
Attorneys

Patented Jan. 17, 1933

1,894,890

UNITED STATES PATENT OFFICE

ANTONIO ROSSI, OF SILVER LAKE, NEW JERSEY

COMBINED AUTOMATIC CLUTCH AND TRANSMISSION MECHANISM FOR AUTOMOBILES

Application filed April 28, 1932. Serial No. 608,056.

This invention relates to certain new and useful improvements in combined automatic clutch and transmission mechanism for automobiles.

The primary object of the invention is to provide combined automatic clutch and transmission mechanism for automobiles that operates in the absence of the usual clutch pedal and gear shift lever, the different running speeds being accomplished by the speed of rotation of the transmission mechanism and the operation of the gas throttle or accelerator pedal.

A further object of the invention is to provide automatic clutch and transmission mechanism of the foregoing character wherein the motor or engine is placed in operation by the usual starter devices while the operation of the clutch and transmission mechanism is automatically accomplished by the increased feeding of gas to the motor or engine.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view illustrating an automobile engine or motor, the rear drive wheel and the intermediately positioned combined automatic clutch and transmission mechanism;

Figure 2 is a fragmentary top plan view with the casing or housing of the combined clutch and transmission mechanism removed;

Figure 3 is an enlarged vertical longitudinal sectional view of the combined automatic clutch and transmission mechanism;

Figure 8 is a cross-sectional view taken on line 8—8 of Figure 3 showing the clutch shoes for the second speed drive;

Figure 4:
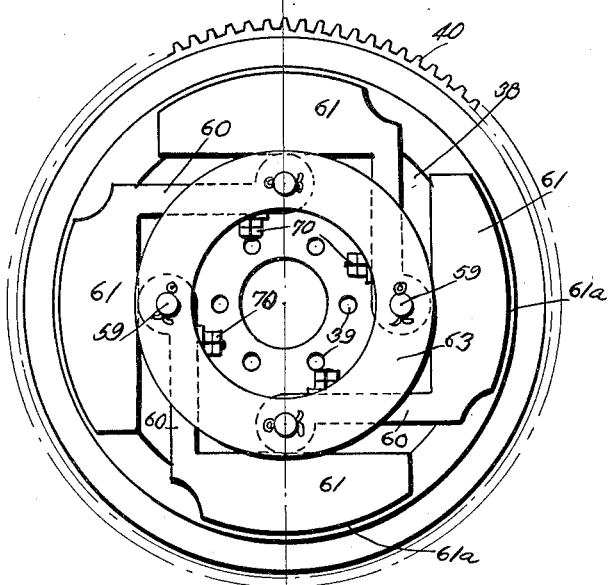
Figure 4 is a side elevational view showing the fly wheel gear and radially shiftable clutch shoes carried thereby.
Figure 7:
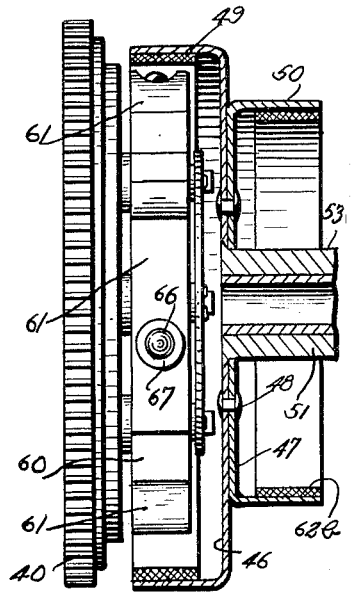
Figure 7 is an edge elevational view of the fly wheel gear and clutch shoes carried thereby with the associated clutch drum shown in section.
Figure 6:
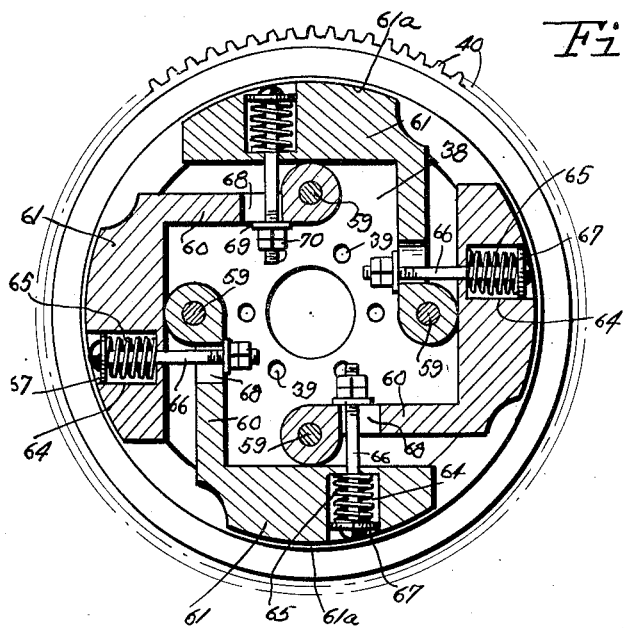
Figure 6 is a vertical cross-sectional view taken on line 6—6 of Figure 5, showing the spring devices associated with the clutch shoes for normally holding them spaced from their associated clutch drum.
Figure 5:
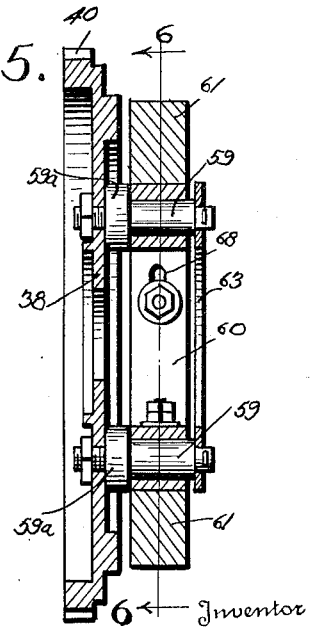
Figure 5 is a vertical cross-sectional view taken on line 5—5 of Figure 4.
Figure 13:
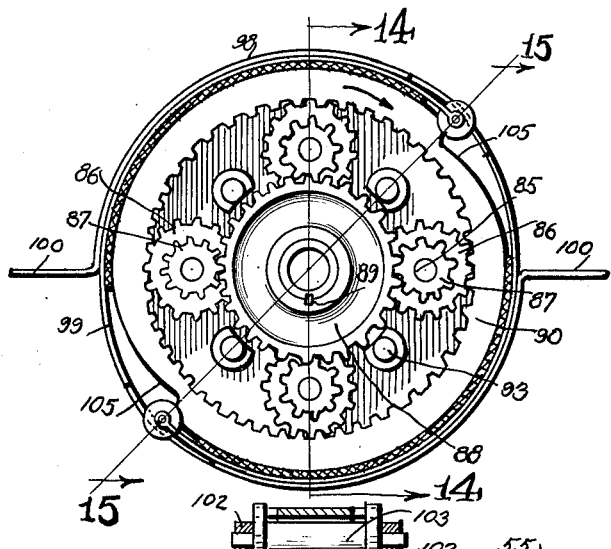
Figure 14:
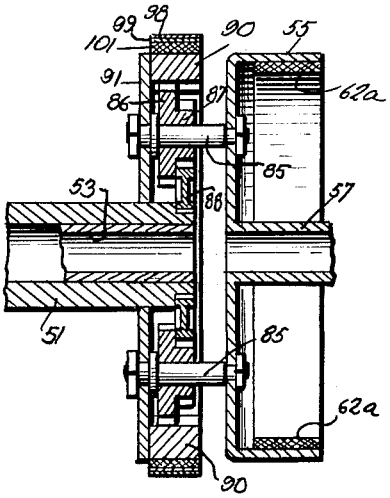
Figure 15:
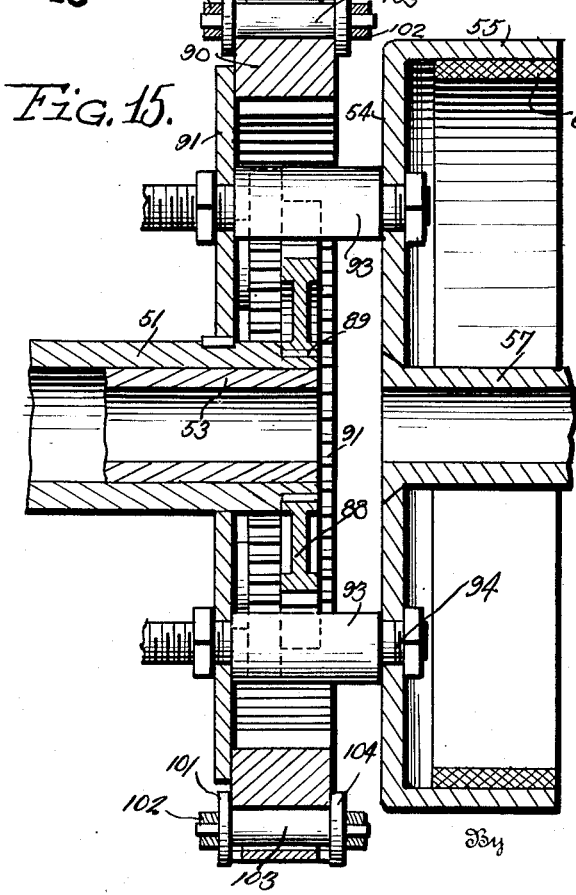
Figures 16, 17:
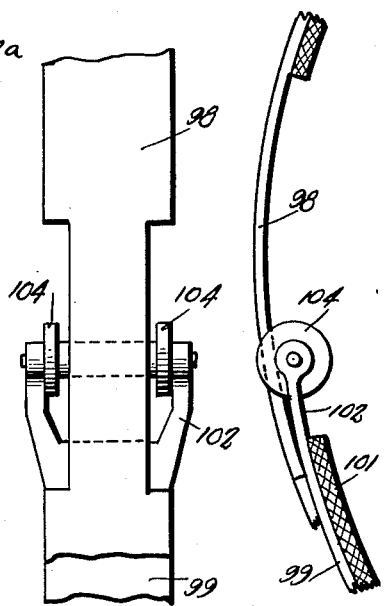

Figures 9 to 11 fragmentarily illustrate, partly in section respectively for three separate speed drives, the tension device associated with the clutch shoe being respectively increased from low to high speed;

Figure 12 is a cross-sectional view taken on line 12—12 of Figure 3, showing the key connection between the end drive disk and the rear drive shaft for the rear axle of the automobile;

Figure 13 is a front elevational view of one of the transmission gear units showing the center drive gear, the planetary gear and the outer ring gear with holding straps associated therewith;

Figure 14 is a vertical cross-sectional view taken on line 14—14 of Figure 13, with a clutch drum added to the transmission gearing unit;

Figure 15 is a cross-sectional view taken on line 15—15 of Figure 13;

Figure 16 is a fragmentary plan view showing overlapped portions of the ring gear holding strap;

Figure 17 is a fragmentary edge elevational view of the ring gear holding strap; and Figure 18 is a detail view, partly in section of the reversing mechanism.

Referring more in detail to the accompanying drawings and particularly to Figures 1 and 2, there is illustrated a combined automatic clutch and transmission mechanism for automobiles, the reference numeral 20 designating the motor or internal combustion engine of the automobile having its crank shaft 21 extending into the housing 22 for the combined clutch and transmission mechanism designated in general by the reference character 23, the rearwardly directed drive shaft 24 being in communication with said mechanism and extending into the differential housing 25 for association with mechanism for driving the rear wheels 26 of the automobile. The side chassis bars 27 of the automobile body are fragmentarily illustrated in Figure 2 and the clutch and transmission mechanism is set within a rectangular bar frame comprising a cross-bar 28 extending between the side chassis bars 27, side frame bars 29 and a connecting end bar 30.

As shown in Figure 3, the housing 22 for the clutch and transmission mechanism includes front and rear end walls 31 and 32 respectively, the crank or drive shaft 21 of the motor extending into the housing through the wall 31, being socketed at its inner end as at 33 and carrying a disk flange 34. The driven shaft 24 is associated with reversing gear mechanism that includes a roller bearing mounting 35 in the rear end wall 32 of the housing 22 that carries a socketed projection 36 at its inner end aligned with the socket 23 in the crank shaft 21, the aligned sockets freely supporting reduced bearing ends of the shaft 37 that support the clutch and transmission mechanism within the housing 22.

As shown more clearly in Figures 3 to 7, the fly wheel for the motor 20 is located within the housing 22 and includes a web portion 38 secured as at 39 to the flange 34 of the drive shaft 21 with a central bearing on the shaft 37. The peripheral edge of the web 38 is in the form of a ring gear 40 that is adapted to be engaged by the usual starter pinion in the customary manner for placing the engine 20 in operation.

While the invention is herein illustrated as a three change speed transmission, it is to be understood that the same may be designed for four speed changes and to accomplish the three speed change for the transmission mechanism, there are provided three clutch devices 41, 42 and 43 and two transmission gear units 44 and 45, all supported upon the shaft 37 within the housing 22, the clutch devices 41 and 42 being adjacent the fly wheel gear 38 and followed by the transmission gear unit 44 while the clutch device 43 is interposed between the transmission gear units 44 and 45.

The clutch devices 41 and 42 include a pair of drums having radial webs 46 and 47 respectively, the web 47 being of less diameter than the web 46 with the two webs bolted together as at 48 and respectively carrying peripheral annular flanges 49 and 50, the flange 49 with its open side being directed toward the fly wheel gear 38 while the flange 50 is directed toward the gear transmission unit 44. The support for the clutch drum includes an elongated sleeve bearing 51 having the central portion of the drum webs 46 and 47 secured thereto as at 52, the sleeve extending along the shaft 37 beyond the free edge of the drum flange 50, the sleeve 51 being mounted upon a collar 53 surrounding the shaft 37 as shown in Figure 3, and being freely rotatable upon the collar and shaft.

The clutch device 43 is similar to the clutch device 42 and includes a drum member having a web 54 carrying a laterally directed annular flange 55 at its peripheral edge directed toward the gear transmission unit 45, the central portion of the drum web 54 being anchored as at 56 to one end of a bearing sleeve 57 similar to the sleeve 51 that projects beyond the free edge of the annular flange 55 toward the gear transmission unit 45, the sleeve 57 being supported upon a collar 58 on the shaft 37 and being freely rotatable thereon. The clutch shoes for the clutch drum flanges 42 and 43 are respectively carried by the gear transmission units 44 and 45 while the clutch shoes for the clutch drum flange 49 are carried by the fly wheel gear 38. As shown in Figures 3 to 7, the web of the fly wheel gear 38 carries four circumferentially spaced pivot bolts 59 projecting laterally of the fly wheel gear and extending into clutch drum 41, each pivot bolt 59 having a clutch arm 60 pivotally mounted thereon within the drum flange 49 and carrying at its outer end the right angularly directed clutch shoe 61, the clutch arms and shoes being so arranged that a clutch shoe is disposed outwardly of an adjacent clutch arm and in proximity of the inner face of the drum flange 49 that is provided with a friction band lining 62 to be engaged by the outer curved faces 61a of the clutch shoes. A collar 59a is mounted on the bearing bolt 59 to space the bearing end of the clutch arm 60 from the web 38 of the fly wheel gear, the projecting ends of the bolt 59 through the clutch arms 60 toward the web 46 of the clutch drum 41 receiving a retaining ring 63 for the clutch arms and shoes. Each clutch shoe 61 is provided with a socket 64 opening at its outer side for the reception of a coil spring 65 through which a screw pin 66 extends from the inner side of the clutch shoe, the outer end of the screw pin 66 having a disk 67 fixed thereto that is engaged with the spring and cooperates with the bottom wall of the socket 64 to maintain the spring 65 under compression. The inner end of the screw pin 66 extends through an opening 68 in the underlying portion of the adjacent clutch arm 60 for the reception of a washer 69 overlying the walls of the opening 68 and retained on the screw pin by the nut 70. It will be understood that the clutch shoes 61 are normally spring pressed inwardly in spaced relation to the clutch drum flange 49.

As shown in Figures 3 and 12, the socketed bearing projection 36 of the bearing 35 for one end of the shaft 37 is of polygonal form in cross-section as indicated at 71 providing a key for the flange collar 72 carried by the disk 73 positioned rearwardly of the gear transmission unit 45. Four circumferentially spaced bearing bolts 74 project laterally of the disk 73 toward the gear transmission unit 45 and freely support a double gear comprising gear wheel portions 75 and 76, the bearing bolts 74 being connected to a disk 77 having its central opening bearing on the adjacent end of the sleeve 57. The bearing bolts are retained in position on the disks 73 and 77 by fastening devices 78. A drive gear 79 is keyed as at 80 to the adjacent end of the sleeve 57 and is in mesh with the gear portion 76 of the double gears upon the bearing bolts 74. An internal ring gear 81 is freely supported upon the gear wheel portion 75 of the four double gears and being retained in position by devices to be presently described.

The disk 77 carries four circumferentially spaced laterally directed pivot posts 82 that extend into the drum flange 55 of the clutch device 43 and pivotally support clutch shoes 83, similar to the clutch shoes 61 that centrifugally move into clutching engagement with the friction lining 62a on the inner face of the flange 55. The clutch shoes 83 are retained in position on the pivot bolts 82 by the ring 84 received on the projecting ends of the pivot bolts and suitably retained thereon.

The web portion 54 of the clutch drum 43 carries four circumferentially spaced bearing bolts 85 for rotatably supporting double gear members of the gear transmission unit 44 comprising gear portions 86 and 87, the gear 87 meshing with a drive gear 88 keyed as at 89 to the adjacent end of the sleeve 51. An internal ring gear 90 has meshing engagement with and is freely supported upon the four gear wheel portions 86 of the double gears and is retained thereon in a manner to be presently described. The forward ends of the bearing bolts 85 have a disk 91 fixed thereto, the bearing bolts 85 being anchored to the clutch drum web 54 and the disk 91 by lock nuts 92 or other fastening devices. The detailed construction of the gear transmission unit 44 is associated with the drum 43, further shown in Figures 13 to 15, the clutch drum web 54 and disk 91 being maintained in spaced relation by the collar members 93 disposed therebetween and associated with the screw bolts 94.

The disk 91 carries four circumferentially spaced pivot bolts 95 which extend within the flange 50 of the clutch device 42 and pivotally support clutch shoes 96, similar to the clutch shoes 61 that centrifugally move into contact with the friction lining 62b on the inner face of the drum flange 50, the connecting ends of the pivot bolts 95 receiving a ring 97 suitably retained thereon and acting to maintain the clutch shoes in position.

The clutch shoes 61, 83 and 96 are of identical construction as described in connection with clutch shoes 61 associated with the clutch device 41 with the exception of the spring device associated with the clutch shoes 83 having lesser resistance to centrifugal movement of the shoes 83 as compared with the clutch shoes 96 while the tension of the springs associated with the clutch shoes 96 is of a character to offer lesser resistance to centrifugal movement of the shoes when compared with movement of the clutch shoes 61, the springs on the clutch shoes 61 being the strongest.

Brake or holding straps are associated with the internal ring gears 81 and 90 and a description of one will answer for both. As shown in Figures 2, 3 and 12 to 17, a pair of strap members enclose each internal ring gear 81 and 90 and include overlapping strap sections 98 and 99, each having an outer end 100 bolted to the side bars 29 of the bar frame inclosing the clutch and transmission mechanism. That portion of each strap section 98 and 99 adjacent the internal ring gear is provided with a friction lining 101. The inner end of each strap section 98 and 99 that are diametrically opposite with respect to the internal ring gear is forked as at 102 in support of a roller 103 that carries end flanges 104 engaged with and enclosing opposite sides of the internal ring gear for holding the same in position with respect to the gear portions 75 or 86 of the associated double gears. The outer face of each internal ring gear is notched as at 105 and into which notches the rollers 103 are normally positioned for retaining the internal ring gears against rotation. The strap members are of a resilient character, normally closing upon each other for the positioning of the rollers 103 into the ring notches 105, but expand or spring outwardly in the presence of a driving urge imparted by increased speed of planetary movement of the double gears around the associated center gear to permit the internal ring gear, the double gears and associated center gear to revolve as a unit.

The brake devices for the automobile include a brake band 106 enclosing the clutch drum flange 49 and operated by the pedal 107 as shown in Figure 2. The brake devices 108 associated with the automobile wheels 26 are both operated by a pedal 109 and a hand lever 110.

The operation of the clutch and transmission mechanism will be better understood from an inspection of Figure 3 of the drawings. The engine 20 is placed in operation by means of the usual starter pinion moving into engagement with the fly wheel gear 40, the fly wheel gear rotating and carrying therewith the clutch shoes 61 that are free from engagement with the friction lining 62 upon the inner face of the flange 49 of the clutch drum 41. When the speed of the engine 20 is increased, the fly wheel gear 40 increases its speed of rotation and centrifugally extends the clutch shoes 61 into frictional engagement with the inner face of the flange 49. It is to be understood that the clutch and transmission mechanism operates in oil contained in the housing 22. With the clutch shoes 61 engaged with the flange 49, the connection between the engine shaft 21 and rear axle drive shaft 24 is by way of the rotating drum webs 46 and 47, the sleeve 51, drive gears 88 that rotate the double gears 86—87, the internal ring gear 90 being restrained from movement by the brake or strap devices associated therewith, thus causing the gears 86—87 to move in a planetary fashion around the drive gear 88. The bearing bolts 85 rotate the clutch drum web 54, sleeve 57, drive gear 79 and double gears 75—76, the internal ring gear 81 being restrained from movement by the strap devices associated therewith. The bearing bolts 74 rotating the disk 73 that is keyed upon the bearing 35 for the axle drive shaft 24. The spring devices associated with the shoes 83 and 96 are of sufficient strength to restrain the clutch shoes from centrifugal movement when the clutch and transmission mechanism is operating on first or low speed.

To move the automobile at a faster rate of speed, and for the automatic operation of the clutch and transmission mechanism for driving at second or intermediate speed, the engine 20 is driven at a faster rate of speed by increasing the gas supply thereto, the increased speed of rotation of the clutch device 42 overcoming the resistance of the spring members associated with the clutch shoes 96 to cause such clutch shoes to move outwardly into frictional engagement with the drum flange 50, this increased speed of rotation causing more rapid rotation of the double gears 86—87 and tending to urge the internal ring gear 90 in the direction of the arrow shown in Figure 13 to displace the rollers 103 from the ring notches 105 whereupon the friction lining on the holding straps 98 and 99 moves outwardly of the internal ring gear to permit the latter to move as a unit with the double gears 86—87 and drive gear 88 thereby forming a direct second speed direct drive from the two clutch devices 41 and 42 and direct the gear transmission unit 44 to the web 54 of the clutch member 43, sleeve 57, drive gear 79, rotating double pinions 75—76 and disk 73 to the shaft 74.

To move the car in third speed or high gear, increased speed of operation of the motor 20 finally overcomes spring resistance offered the centrifugal movement of the clutch shoes 83 whereupon they swing outwardly into frictional engagement with the friction lining 62a upon the flange 55 while the strap devices associated with the internal ring gear 81 are also disengaged therefrom so that the drive gear 79, double gears 75—76 and disk 73 rotate as a unit, the drive at this time then being directed to the three clutch devices and the two gear transmission devices to the drive shaft 24.

The automatically operating clutch shoes 61 are disengaged from their associated clutch drum flanges when the speed of operation of the engine 20 is reduced so that free wheeling of the automobile is present without the manual operation of any clutches or gear shift mechanism. The starting of the automobile is accomplished in an even and smooth manner as the clutch shoes and drum as well as the gear transmission devices operate in an oil bath causing the clutch shoes to take gradually to the clutch drums in the propulsion of the automobile. The spring devices associated with the clutch shoes 61, 96 and 83 decrease in tension respectively as the speed of rotation of the clutch shoes 96 and 83 increases, due to the planetary gear movement of gears 86—87 and 75—76 causing the clutch shoes 96 and 83 to travel at slower rates of speed than the clutch shoes 61 when the latter are engaged with the drum flange 49. This slower speed of rotation of the clutch shoes 96 and 83 compensates for changes in speed. As the speed of rotation increases, the spring devices associated with the second or intermediate clutch shoes 96 are overcome by centrifugal action of said clutch shoes to permit the latter to move outwardly into engagement with the drum flange 50, the clutch shoes 61 and 96 then moving as a unit while the clutch shoes 83 rotate at a slower rate of speed due to planetary movement of the double gears 75—76 around the gear 79. In a like manner, when the engine travels at a greater or maximum speed, the clutch shoes 83 are centrifugally moved outwardly into engagement with the drum flange 55 with the entire transmission mechanism moving as a unit for direct or high speed drive. As stated, the spring devices associated with the clutch shoes 61, 96 and 83 possess successively increased tension, compensating for difference in speeds of rotation of the three sets of clutch shoes in the presence of the planetary gear devices, and automatically accomplishing the three speeds of drive controlled by the R. P. M. of the engine and the feeding of fuel thereto.

Gear mechanism for reversing the direction of rotation of the driven shaft 24 is interposed between the forward end of said shaft and the rear end of the transmission mechanism supporting shaft 37 and includes the bearing mounting 35 shown in Figs. 1, 2, 3 and 18. The reversing gear mechanism is mounted within a casing 111, the bearing mounting 35 being socketed at the end thereof that extends into the transmission housing 22 as previously described for the support of the adjacent end of the shaft 37, while the end of the bearing mounting 35 within the casing 111 is socketed as at 112 to form a bearing for one end of the shaft 113 that extends rearwardly of the casing 111 for communication with the universal joint 114 to which the forward end of the driven shaft 24 is connected. The end of the bearing mounting 35 within the casing 111 is provided with a pinion 115 that constantly meshes with a gear 116 upon the shaft 117 journalled in the side walls of the casing 111, the other end of the shaft 117 carrying a gear 118 that constantly meshes with the pinion 119 carried by the shaft 120 journalled in the side walls of the casing. The shaft 113 rearwardly of the pinion 115 is longitudinally splined as at 121 for the slidable support of a unitary gear element comprising an internal gear 122 facing the pinion 115, a gear wheel 123 and a grooved collar member 124 to take the forked end of a shifting lever 125 shown in Figure 1. When the gear member comprising the internal gear 122 and the gear wheel 123 is in the position shown in Figure 18, the drive and transmission mechanism is separated from the driven shaft 24, the pinion 115 rotating the gear 116, gear 118 and pinion 119 that is spaced from the gear wheel 123. The reversing gear mechanism is so disposed when repair work or the like is being made upon the engine so that the latter is permitted to operate at any speed without propelling the vehicle or operating the driven shaft 24. When the internal gear 122 is moved forwardly by the lever 125, the same is placed in enclosing relation with respect to the pinion 115 so that the drive is direct from the pinion 115 and internal gear 122 to the shaft 113, universal 114 and shaft 24. To reverse the direction of rotation of the driven shaft 24, the gear wheel 123 is shifted by the lever 125 in a rearward direction to engage with the pinion 119 which results in the separation of the internal gear 122 from the pinion 115, the reverse rotation of driven shaft 24 being accomplished by the connection between the pinion 115, gear 116, gear 118, pinion 119, gear wheel 123 splined upon the shaft 113.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:—

1. In a combined automatic clutch and transmission mechanism for automobiles, a series of inter-connected clutch and gear transmission devices, the clutch devices including drum members and clutch shoes centrifugally movable into engagement with the drum members, each gear transmission device including a drive gear operated by an adjacent clutch device, driven gears operated by the drive gear for operating a part of an adjacent clutch device, a ring gear inclosing the driven gears of each gear transmission device, said ring gear having notches provided in its outer periphery, and spring pressed latch members normally seated in said notches and forming means for holding the ring gears stationary when the clutch shoes associated therewith are inoperative and the holding means of each gear unit being rendered inoperative when the associated clutch shoes are engaged with its drum to allow the ring gear, driven and drive gears to rotate as a unit.

2. In a combined automatic clutch and transmission change speed mechanism for automobiles, a series of inter-connected clutch and gear transmission devices, the clutch devices including drum members and clutch shoes centrifugally movable into engagement with the drum members, one of the clutch devices being associated with each change of speed and the clutch devices being sequentially operated in the presence of increased speed of rotation, each gear transmission device including a drive gear operated by an adjacent clutch device, driven gears operated by the drive gear for operating a part of an adjacent clutch device, a ring gear inclosing the driven gears of each unit, said ring gear having notches provided in its outer periphery, and spring pressed latch members normally seated in said notches and forming means for holding the ring gears stationary when the clutch shoes associated therewith are inoperative and the holding means of each gear unit being rendered inoperative when the associated clutch shoes are engaged with its drum to allow the ring gear, driven and drive gears to rotate as a unit.

3. In a combined automatic clutch and transmission mechanism for automobiles, a series of inter-connected clutch and gear transmission devices, the clutch devices including drum members and clutch shoes centrifugally movable into engagement with the drum members, each clutch shoe having a pivoted clutch arm and a resilient connection between each clutch shoe and arm of the adjacent shoe for normally holding the clutch shoes in inoperative positions, each gear transmission device including a drive gear operated by an adjacent clutch device, driven gears operated by the drive gear for operating a part of an adjacent clutch device, a ring gear inclosing the driven gear of each unit, said ring gear having notches provided in its outer periphery, and spring pressed latch members normally seated in said notches and forming means for holding the ring gears stationary when the clutch shoes associated therewith are inoperative and the holding means of each gear unit being rendered inoperative when the associated clutch shoes are engaged with its drum to allow the ring gear, driven and drive gears to rotate as a unit.

4. In a combined automatic clutch and transmission change speed mechanism for automobiles, a series of inter-connected clutch and gear transmission devices, the clutch devices including drum members and clutch shoes centrifugally movable into engagement with the drum members, one of the clutch devices being associated with each change of speed and the clutch devices being sequentially operated in the presence of increased speed of rotation, each clutch shoe having a pivoted clutch arm and a resilient connection between each clutch shoe and arm of the adjacent shoe for normally holding the clutch shoes in inoperative positions, each gear transmission device including a drive gear operated by an adjacent clutch device, driven gears operated by the drive gear for operating a part of an adjacent clutch device, a ring gear inclosing the driven gears of each unit, said ring gear having notches provided in its outer periphery, and spring pressed latch members normally seated in said notches and forming means for holding the ring gears stationary when the clutch shoes associated therewith are inoperative and the holding means of each gear unit being rendered inoperative when the associated clutch shoes are engaged with its drum to allow the ring gear, -driven and drive gears to rotate as a unit.

5. In a combined automatic clutch and transmission mechanism for automobiles, a series of inter-connected clutch and gear transmission devices automatically sequentially operable for gear change speed increases, the automatic operation of the devices being effected by increased throttle action or gas feed and all of the devices rendered inoperable when the gas feed is shut off whereby the automobile may travel at high speed with automatic disconnection of the clutch and gear devices, a fly wheel gear, each clutch device including a drum, clutch shoes for the respective drums carried by the fly wheel gear and gear transmission devices, a series of clutch shoes in each set, the shoes being pivotally mounted with adjacent shoes overlapping the spring devices connecting the overlapping portions of the shoes for normally holding the shoes inoperatively positioned with respect to their associated drums, and each gear transmission device having a positive connection with an adjacent clutch drum, a drive gear forming said connection, planetary gears associated with the drive gear, an internal ring gear inclosing the planetary gears, said ring gear having notches provided in its outer periphery, and spring pressed latch members normally seated in said notches and forming means associated with the ring gear and operable at predetermined speeds of rotation of the drive gear for holding the ring gear stationary when the planetary gears translate and releasable from the ring gear to permit the same to rotate with the planetary and drive gears.

6. In a device of the kind described, a driven shaft, a clutch including a drum and shoes operating by centrifugal force to grip the drum, means to impart rotary movement about the axial line of said shaft to said shoes whereby to cause them to grip the drum, and an operative connection between the drum and driven shaft including an inner gear driven from said drum, a ring gear concentrically surrounding said inner gear, planetary gears meshing with the inner and ring gears and driving means for a shaft carrying said planetary gears, said ring gear being provided with peripheral notches, and spring pressed pawls normally seated in said notches and releasable upon increase of speed of the planetary gears beyond a predetermined velocity of rotation.

7. In a device of the kind described, a driven shaft, a clutch including a drum and shoes operating by centrifugal force to grip the drum, means to impart rotary movement about the axial line of said shaft to said shoes whereby to cause them to grip the drum, and an operative connection between the drum and driven shaft including an inner gear driven from said drum, a ring gear concentrically surrounding said inner gear, planetary gears meshing with the inner and ring gears and driving means for a shaft carrying said planetary gears, said ring gear being provided with peripheral notches, pawls normally engaging said notches, and spring brake bands surrounding said ring gear and carrying said pawls, said brake bands normally gripping said ring gear but being arranged to free the ring gear by the radial movement of said pawls upon movement of the gear to free the pawls from the notches under increase of rotative stress by increase of speed of the planetary gears.

8. In a device of the kind described, a driven shaft, a clutch including a drum and shoes operating by centrifugal force to grip the drum, means to impart rotary movement about the axial line of said shaft to said shoes whereby to cause them to grip the drum, and an operative connection between the drum and driven shaft including an inner gear driven from said drum, a ring gear concentrically surrounding said inner gear, planetary gears meshing with the inner and ring gears and driving means for a shaft carrying said planetary gears, said ring gear being provided with peripheral notches, rollers constituting pawls normally engaging said notches, and spring brake bands surrounding said ring gear and carrying said rollers, said brake bands normally gripping said ring gear but being arranged to free the ring gear by the radial movement of said pawls upon movement of the gear to free the rollers from the notches under increase of rotative stress by increase of speed of the planetary gears.

9. In a device of the kind described, a driven shaft, a clutch including a drum and shoes operating by centrifugal force to grip the drum, means to impart rotary movement about the axial line of said shaft to said shoes whereby to cause them to grip the drum, and an operative connection between the drum and driven shaft including an inner gear driven from said drum, a ring gear concentrically surrounding said inner gear, planetary gears meshing with the inner and ring gears and driving means for a shaft carrying said planetary gears, said ring gear being provided with peripheral notches, and spring pressed pawls normally seated in said notches and releasable upon increase of speed of the planetary gears beyond a predetermined velocity of rotation, said notches each having one side abrupt to prevent disengagement of the pawls upon the ring gear tending to rotate in a backward direction and having the other side inclined gradually to merge with the peripheral surface of the ring gear to permit relatively easy lifting of the pawls from the notches.

10. In a device of the kind described, a driven shaft, a clutch including a drum and shoes operating by centrifugal force to grip the drum, means to impart rotary movement about the axial line of said shaft to said shoes whereby to cause them to grip the drum, and an operative connection between the drum and driven shaft including an inner gear driven from said drum, a ring gear concentrically surrounding said inner gear, planetary gears meshing with the inner and ring gears and driving means for a shaft carrying said planetary gears, said ring gear being provided with peripheral notches, pawls normally engaging said notches, and spring brake bands surrounding said ring gear and carrying said pawls, said brake bands normally gripping said ring gear but being arranged to free the ring gear by the radial movement of said pawls upon movement of the gear to free the pawls from the notches under increase of rotative stress by increase of speed of the plantary gears, said notches each having one side abrupt to prevent disengagement of the pawls upon the ring gear tending to rotate in a backward direction and having the other side inclined gradually to merge with the peripheral surface of the ring gear to permit relatively easy lifting of the pawls from the notches.

11. In a device of the kind described, a driven shaft, a clutch including a drum and shoes operating by centrifugal force to grip the drum, means to impart rotary movement about the axial line of said shaft to said shoes whereby to cause them to grip the drum, and an operative connection between the drum and driven shaft including an inner gear driven from said drum, a ring gear concentrically surrounding said inner gear, planetary gears meshing with the inner and ring gears and driving means for a shaft carrying said planetary gears, said ring gear being provided with peripheral notches, rollers constituting pawls normally engaging said notches, and spring brake bands surrounding said ring gear and carrying said rollers, said brake bands normally gripping said ring gear but being arranged to free the ring gear by the radial movement of said pawls upon movement of the gear to free the rollers from the notches under increase of rotative stress by increase of speed of the planetary gears, said notches each having one side abrupt to prevent disengagement of the rollers upon the ring gear tending to rotate in a backward direction and having the other side inclined gradually to merge with the peripheral surface of the ring gear to permit relative easy lifting of the rollers from the notches.

In testimony whereof I affix my signature.

ANTONIO ROSSI.